US012711835B2

(12) United States Patent
Soukup et al.

(10) Patent No.: US 12,711,835 B2
(45) Date of Patent: Aug. 18, 2026

(54) SYSTEM, METHOD, AND PROGRAM USING NEAR FIELD COMMUNICATION TO FACILITATE THE PURCHASE OF WAGERING CREDITS AT A GAMING DEVICE

(71) Applicant: Konami Gaming, Inc., Las Vegas, NV (US)

(72) Inventors: Thomas E. Soukup, Las Vegas, NV (US); Edward Sepich, Henderson, NV (US); Jeffrey George, Las Vegas, NV (US)

(73) Assignee: Konami Gaming, Inc., Las Vegas, NV (US)

(*) Notice: Subject to any disclaimer, the term of this patent is extended or adjusted under 35 U.S.C. 154(b) by 231 days.

(21) Appl. No.: 18/543,363

(22) Filed: Dec. 18, 2023

(65) Prior Publication Data

US 2024/0212446 A1 Jun. 27, 2024

Related U.S. Application Data

(60) Provisional application No. 63/434,740, filed on Dec. 22, 2022.

(51) Int. Cl.
*G07F 17/32* (2006.01)
*G06Q 20/34* (2012.01)

(52) U.S. Cl.
CPC ....... *G07F 17/3244* (2013.01); *G06Q 20/352* (2013.01); *G07F 17/3239* (2013.01)

(58) Field of Classification Search
CPC .................................................. G06Q 20/352
See application file for complete search history.

(56) References Cited

U.S. PATENT DOCUMENTS

| | | | | |
|---|---|---|---|---|
| 10,600,281 | B2 | 3/2020 | Sepich et al. | |
| 2011/0313869 | A1* | 12/2011 | McAlhaney | G06Q 20/20 705/16 |
| 2013/0116032 | A1* | 5/2013 | Lutnick | G07F 17/3279 463/25 |
| 2015/0095203 | A1* | 4/2015 | Howe | G06Q 40/12 705/30 |
| 2015/0134541 | A1* | 5/2015 | Woolf | G06Q 20/3226 705/72 |
| 2015/0317638 | A1* | 11/2015 | Donaldson | G06Q 20/385 705/44 |
| 2016/0379201 | A1* | 12/2016 | Sabet | G06Q 20/322 705/39 |
| 2021/0209893 | A1* | 7/2021 | Rye | G07F 17/3241 |
| 2024/0109178 | A1* | 4/2024 | Butler | G06F 3/0488 |

* cited by examiner

*Primary Examiner* — Jeffrey K Wong
(74) *Attorney, Agent, or Firm* — Howard & Howard Attorneys PLLC

(57) ABSTRACT

A networked computer system is described herein. The networked computer system includes a plurality of gaming devices coupled to a plurality of player tracking devices, and a player tracking system including a processor coupled in communication with each player tracking device. Each player tracking device is coupled to a near field communication (NFC) reader configured to receive NFC payment information data from a credit or debit card or mobile wallet upon a player indicating they wish to purchase a certain amount of gaming credits via an interactive touchscreen display device at a gaming device.

14 Claims, 4 Drawing Sheets

SYSTEM, METHOD, AND PROGRAM USING NEAR FIELD COMMUNICATION TO FACILITATE THE PURCHASE OF WAGERING CREDITS AT A GAMING DEVICE

CROSS REFERENCE TO RELATED APPLICATION

This application claims the benefit of U.S. Provisional Patent Application Ser. No. 63/434,740, filed Dec. 22, 2022, the disclosures of which are hereby incorporated by reference in their entirety.

TECHNICAL FIELD

The present invention relates generally to casino management systems, and more particularly, to a casino management system which uses near field communication to enable players to perform financial transactions with their credit or debit "chip" cards or mobile phone wallet applications at the gaming device or a workstation or employee mobile in communication with the casino management system.

BACKGROUND OF THE INVENTION

The growth and competition in the casino gaming market in recent years and the increasingly sophisticated and complex technology being integrated into the gaming environment, presents both challenges and opportunities to gaming establishment operators. Over recent years, other retail industries have embraced enabling customers to pay for goods and services using cashless methods such as, credit or debit card, mobile wallet application linked to stored payment methods (wallets), among other cashless methods. Traditionally, patron tracking systems have focused on tracking patrons of electronic gaming machines, table games and other gaming revenue areas such as, bingo, keno, sportsbook, and online gaming. In this traditional scenario, a patron is identified during gaming play by a patron tracking loyalty card and/or a patron identification number (PIN). The patron tracking system tracks the patron's gaming play and may award patron tracking points, bonuses, and other incentives according to established criteria to promote continued patron loyalty. Known casino management systems include player tracking devices that are connected to gaming machines. The player tracking devices require players to insert player loyalty cards that include player identification numbers encoded on magnetic strips. The player tracking devices include magnetic strip card readers that read the encoded player account number from the magnetic strip to allow the player to access the corresponding player tracking account and services provided by the player tracking system.

At least some known magnetic strip card readers may be vulnerable to security risks that include tampering using a card skimming device that is placed over the magnetic strip card reader and is used to record the information encoded in the magnetic strip of the player identification card. Because these card skimming devices are placed over existing magnetic strip card readers, a player may unknowingly insert the player card through the skimming device when attempting to insert the player card into the magnetic strip card readers of the gaming machine, thus allowing the skimming device to record the player identification number associated with the player's player tracking account. The persons intent on stealing personal information about the player may then remove the skimming device, obtain the player identification numbers recorded by the card skimming device, and access player tracking accounts using the stolen player account numbers.

To overcome the security vulnerability with using magnetic strip player loyalty cards, some player tracking system use near field communication (NFC) enabled player loyalty cards to enable the player to log into the player tracking system by holding their NFC enable player loyalty card near the NFC reader versus inserting their player loyalty card into the magnetic card reader. In this scenario, the network computer system includes a near field communication (NFC) reader coupled to a gaming device and a player tracking system. The player tracking system is programmed to receive an NFC signal including a player identification number (ID), access a plurality of player account records and select a matching player account record having a corresponding player ID matching the received player ID, retrieve account information included in the matching player account record, display the account information on the gaming device and commence player tracking. One such system which may be used in the present invention is described in U.S. Pat. No. 10,600,281 to Edward Sepich et al., which is incorporated herein by reference in its entirely.

Similarly, card-based payment companies have embedded smart chips to payment cards such as Visa, Mastercard, American Express, Discoverer, and others, to enhance the security and reduce fraud versus relying on reading the data encoded on the magnetic strip. Europay, Mastercard and Visa (EMV) smart chip card enabled transactions improve security against fraud compared to magnetic stripe card transactions that rely on the holder's signature and/or visual inspection of the card to check for features such as hologram. The use of a personal identification number (PIN) and cryptographic algorithms such as Triple DES, RSA and SHA provide authentication of the card to the processing terminal and the card issuer's host system. The processing time is comparable to online transactions, in which communications delay accounts for most of the time, while cryptographic operations at the terminal take comparatively little time. The supposed increased protection from fraud has allowed banks and credit card issuers to push through a "liability shift", such that merchants are now liable (as of 1 Jan. 2005 in the EU region and 1 Oct. 2015 in the US) for any fraud that results from transactions on systems that are not EMV-capable. Many implementations of EMV payment cards and terminals confirm the identity of the cardholder by requiring the entry of a personal identification number (PIN) rather than signing a paper receipt. Whether or not PIN authentication takes place depends upon the capabilities of the terminal and programming of the payment card.

Payment terminals, used at point-of-sale, hotel, and other point of purchase venues, offer a method for customers use their credit or debit card by holding them close to an NFC reader of the customer payment terminal versus relying on reading from the traditional magnetic strip. If the smart chip card is a chip-and-signature card, no additional customer input is needed; however, the typically the merchant may manually verify additional credentials from the card holder. If the smart chip card is a chip-and-PIN, the customer may be prompted to enter in the PIN associated with the cards at the payment terminal.

The payment terminal sends the associated merchant's identification number, the card information, and the transaction amount to the card processor. The processor's system reads the information and sends the authorization request to the specific issuing bank through the card network. The issuing bank conducts a series of checks for fraud and verifies that the cardholder's available credit line is sufficient to cover the purchase before returning a response, either granting or denying authorization. The merchant acquirer receives the response and relays it to the merchant. Usually, this process takes no more than a few seconds.

Once the card has been authorized, the second part of the transaction is clearing it, or getting the goods to the customer and the money to the merchant's bank. The merchant sends transactions to the merchant acquirer, and the merchant acquirer sends that information along to the merchant accounting system, or MAS, that supports an individual merchant's account.

The MAS distributes the transactions to the appropriate network-Visa transactions to the Visa network, MasterCard transactions to the MasterCard network, and so forth. Next, the MAS deducts the appropriate merchant discount fee (to cover the costs of the merchant acquirer's activities) from the transaction amount and generates instructions to remit the difference to the merchant's bank for deposit into the merchant's account. The MAS sends these instructions to the automated clearinghouse (ACH) network, which is a computer-based system used to process electronic transactions between participating depository institutions.

Similar to the using a "chip" enabled credit or debit card to purchase goods and services elsewhere in a casino environment, a casino player may want to use their credit or debit cards to purchase wagering credits at the gaming device like normal good and services purchases via payment terminals; however, currently they must visit an Automated Teller Machine (ATM), other payment processing Kiosks or cage to perform the financial transaction which dispenses the funds as physical cash, a casino TITO voucher, or other currencies accepted by the gaming devices. These currencies are then used to insert into the gaming device to purchase wagering credits at the gaming device. The requirement to visit an ATM, payment processing Kiosk or the casino cage versus being able to perform the financial transaction directly at the gaming device causes friction to the player as they must physically leave the gaming device to visit the ATM, payment processing Kiosk or the cage. One such system and method is described in U.S. Pat. No. 8,556,707 to Craig Potts et al., which is incorporated herein by reference. However, the system and methods described in this patent requires the player to enroll in the player loyalty program or be a member of the player loyalty program which causes friction to players who may wish to remain anonymous and simply want to use their credit or debit cards to purchase additional wagering credits at the gaming device or have previously established a cashless wagering account linked to their player account.

In other instances, retail customer may prefer to use a mobile application (mobile wallet) which is linked to their various funding sources, such as, Apple Pay, Google Wallet, or other mobile phone funding mechanisms which are linked to a customer's stored funding sources such as personal credit, debit, or banking accounts. In this instance, customer holds their mobile phone near the NFC reader of the payment terminal to pay for the goods or services using funds from sources linked to their mobile wallet.

In the case of Google Wallet, a customer is issued a Google Wallet Virtual Card. This Virtual Card is issued by Bancorp Bank through Google, and it essentially acts as an intermediary between the customer's preferred card and the merchant. To enable the use of the Google Mobile Wallet Service via a customer's NFC mobile device, GPC [Google Payment Corporation] has arranged for Bancorp to provide the customer with access to a MasterCard®-branded virtual prepaid debit payment card product, the Google Wallet Virtual Card, which is stored on the customer's mobile device. This setup naturally makes the four-party payments system more complicated. For example, instead of having the customer's Chase-issued Visa card information sent from the merchant's payment terminal to the merchant acquirer, the Google Wallet Virtual Card requests the funds from the customer's preferred credit or debit card, and the Virtual Card information is then sent to the merchant, who subsequently sends it on to the payment processor. From there, that information is processed as a traditional card's information would be like using a "chip" enabled credit or debit card to pay for goods and services at a payment terminal.

Like with Google Wallet, making a contactless payment using Apple's phone requires the user to verify the payment on the phone before it can go through. Whereas Google Wallet uses a four-digit PIN, Apple Pay requires the customer to verify using TouchID, which reads the user's fingerprint. Apple has introduced tokenization into its payment system. Like Google Wallet's Virtual Card, this obfuscates the customer's actual credit card number. It all happens without having to go through another bank as an intermediary supplier of a virtual card. In a simple credit card transaction, card details are sent to the bank for authorization, and an approval comes back to the merchant that lets the transaction go through. The Apple Pay setup, is the only time a customer's real credit card information is passed around between Apple and an issuer. Once the information gets to the card network, it's decrypted, and the card network issues a token called a Device Account Number (DAN). The DAN is device specific. The card network sends this DAN to Apple along with other information such as the key used to generate dynamic security codes unique to each transaction. When a customer wants to make a payment with Apple Pay, the customer holds their phone near the NFC-enabled payment terminal, the phone will ask the customer to authenticate the payment with TouchID. That authentication signals to the phone that it can transmit the Device Account Number and its accompanying "transaction specific dynamic security code" to the merchant's terminal, and the transaction then proceeds as a normal credit card transaction would. The only difference is the bank network or issuer verifies that the payment information is coming from the correct device and has not been duplicated.

Similar to the either Google Wallet or Apple Pay to purchase goods and services elsewhere in a casino environment A casino player may want to use their mobile application wallet to purchase wagering credits like retail purchases; however, currently, they must download and install the casino specific mobile application, link their mobile wallet to the casino mobile application, become or be a member of the player loyalty program and link their mobile wallet to their player loyalty account. One such system and method is described in U.S. Pat. No. 10,460,563 to Sina Miri et al., which is incorporated herein by reference. However, the system and method described in this patent requires the player to enroll in player loyalty program or be a member of the player loyalty program which causes friction to players who may wish to remain anonymous and simply want to use the mobile wallet to purchase additional wagering credits at the gaming device without having to link their mobile wallet to the player loyalty program or have previously established a cashless wagering account linked to their player account. Often, they must establish an account with the payment processor to facilitate the linking of funding sources such as their credit or debit cards. To establish this account, the player must supply additional Know Your Customer (KYC) information such as name, address, date of birth, social security number, etc., which many players consider an invasion of their privacy and do not feel comfortable providing. One such system and method is described in U.S. Pat. No. 9,990,801 to Kirk Sanford et al., which is incorporated herein by reference.

In other scenarios, a player may want to use their credit or debit card or mobile wallet to purchase table game chips or to deposit funds into their cashless wagering account. Recently, some 3rd party payment processors have installed payment terminals at table games to facilitate the use of a credit or debit card to purchase table game chips. Additionally, payment terminals may be available at the cage window for players to use their credit or debit cards. However, as these methods are not integrated into the casino accounting system nor integrated with the player's wagering account, there is double entry of the financial transactions into multiple systems and thus twice the accounting and auditing work.

Accordingly, a system and methods are needed to enable to the player seamlessly purchase wagering credits at a gaming device similar to the methods they are comfortable with when paying for retail products and services no matter whether they are members of the casino loyalty program or not and whether they prefer to use a credit or debit card or mobile wallet to purchase those wagering credits.

The present invention is aimed at one or more of the problems as set forth above.

SUMMARY OF THE INVENTION

In one aspect of the present invention, a networked computer system is provided. The networked computer system includes a plurality of gaming devices coupled to a plurality of player tracking devices, and a player tracking system including a processor coupled in communication with each player tracking device. Each player tracking device is coupled to a near field communication (NFC) reader configured to receive NFC payment information data from a credit or debit card or mobile wallet upon a player indicating they wish to purchase a certain amount of gaming credits via an interactive touchscreen display device at a gaming device. The processor of the player tracking system programmed to execute an algorithm including the steps of receiving a request from a player tracking device indicating an amount of gaming credits to purchase to be used with a corresponding gaming device, receiving a signal from the NFC reader indicating payment information data received from the credit or debit card or mobile wallet via the NFC reader, transmitting a purchase request including the requested amount of gaming credits to purchase and the received payment information to a payment processor for authorization, and upon receiving approval of the purchase request from the payment processor, adding the amount of gaming credit to purchase to the credit meter of the corresponding gaming device.

In another aspect of the present invention, a networked computer system is provided. The networked computer system includes a plurality of gaming devices coupled to a plurality of player tracking devices, and a player tracking system including a processor coupled in communication with each player tracking device and to a 3rd party system. Each player tracking device includes an interactive touchscreen display device and an NFC reader configured to receive NFC payment information data from a credit or debit card or mobile wallet upon a player indicating they wish to purchase a certain amount of gaming credits at the gaming device. The processor of the player tracking system is programmed to execute an algorithm including the steps of receiving a request from a player tracking device indicating an amount of gaming credits to purchase to be used with a corresponding gaming device, transmitting a request to the 3rd party system to invoke an interactive payment processor web page and displaying the interactive payment processor webpage on the interactive touchscreen display device, receiving payment information data from the NFC reader, transmitting a purchase request including the requested amount of gaming credits to purchase and payment information to the 3rd party system via the interactive payment processor webpage for authorization, and upon approval of the purchase by the payment processor web page, adding the amount of gaming credit purchased to the credit meter of the corresponding gaming device.

In yet another aspect of the present invention, a networked computer system is provided. The networked computer system includes a workstation or an employee mobile device including an NFC reader configured to receive NFC payment information data from a credit or debit card or mobile wallet upon a player indicating they wish to purchase a certain amount of gaming credits to the workstation or an employee mobile device employee, and a player tracking system in communication with the workstation or the employee mobile device and with a 3rd party payment processor system. The player tracking system includes a processor programmed to execute an algorithm including the steps of receiving the payment information data from the NFC reader, transmitting an amount of gaming credits to purchase and payment information to the 3rd party payment processor system for authorization, and upon receiving approval of the purchase from the 3rd party payment processor system, providing the player with wagering chips equivalent to the purchase amount.

BRIEF DESCRIPTION OF DRAWINGS

Other advantages and embodiments of the present inventions will be readily appreciated as the same become better understood by reference of the following detail description when considered in connection with the accompanying drawings wherein.

DETAILED DESCRIPTION OF EMBODIMENTS

Figure 1:
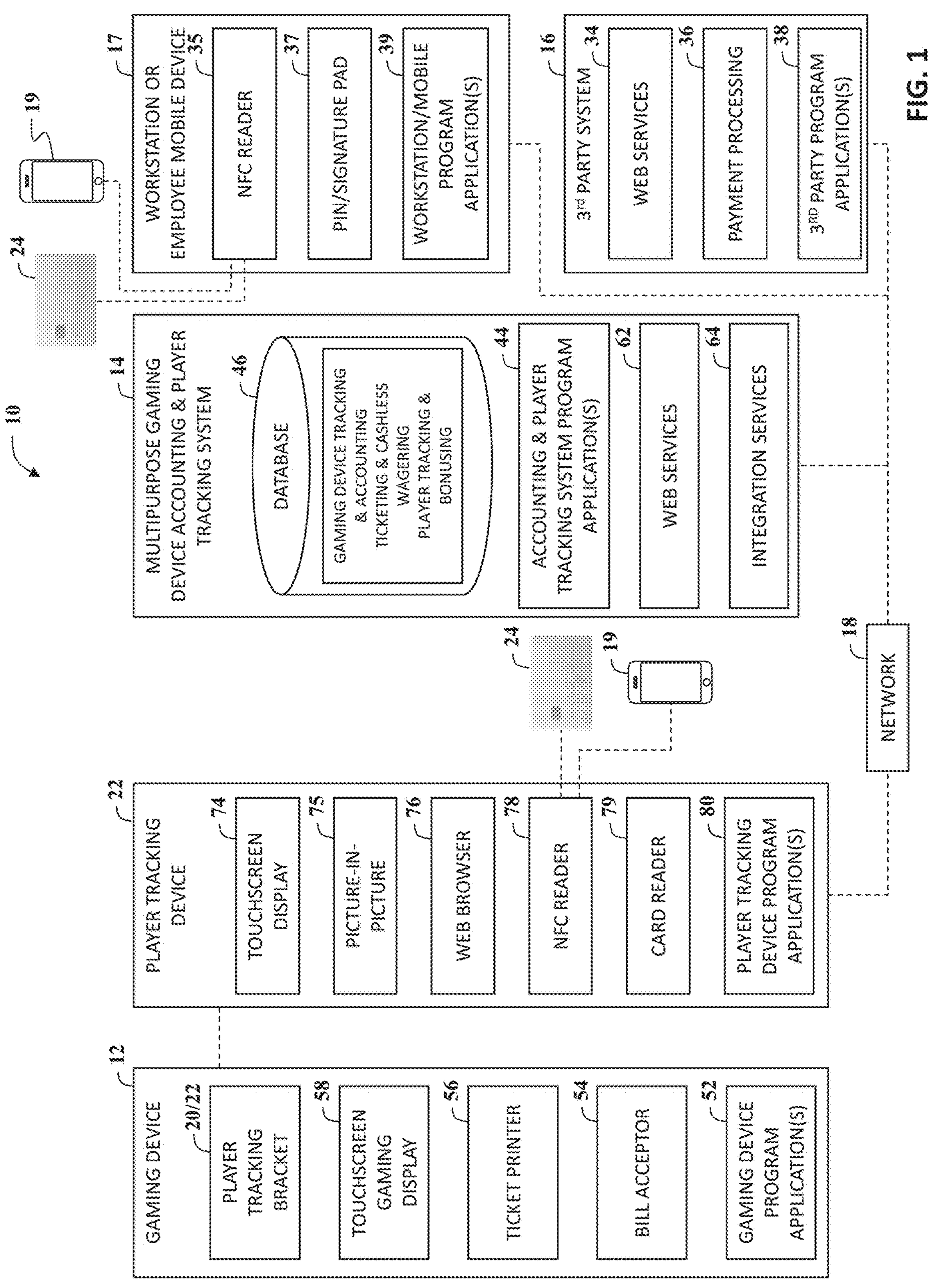
FIG. 1 is a schematic diagram of the networked computer system and components for providing gaming property services to players via a gaming device, a workstation or employee mobile device, according to embodiments of the present invention.

With reference to the drawings, and in operations, the present invention improves the functions of known casino manage systems coupled with payment processing systems by providing a system 10 that enables players to use their EMV (Europay, Visa and Mastercard) smart chip credit or debit cards or mobile device wallets to purchase wagering credits at gaming devices using information transmitted wirelessly using near field communication (NFC) readers coupled to the player tracking device.

Selected embodiments of the present invention will now be explained with reference to the drawings. It will be apparent to those skilled in the art from this disclosure that the following description of the embodiments of the invention is provided for illustration only and not for the purpose of limiting the invention as defined by the claims and their equivalents.

In different embodiments of the present invention, a system and method for operating a networked computer system including a near field communication (NFC) reader coupled to a gaming device and a player tracking system coupled to a plurality of 3rd party systems, or networked computer system including a near field communication (NFC) reader coupled to a workstation or employee mobile coupled to a player tracking system coupled to a plurality of 3rd party systems are provided.

In one embodiment of the present invention, the system disclosed herein provides a system and method for a player to use their credit or debit smart chip card or mobile wallet to perform a financial transaction to purchase gaming credits at a gaming device facilitated by the reading of the credit or debit smart chip information or mobile wallet information by way of the near field communication (NFC) reader coupled to a gaming device and a player tracking system couple to a plurality of 3rd party systems. In addition to the NFC reader, the player tracking system includes an interactive touch screen display which can be used display a "Buy Credits" button that enables the player to indicate they wish to purchase wagering credits with their credit or debit card or mobile wallet. The "Buy Credits" button may be displayed to both players logged or not logged in into their player loyalty accounts at the gaming device at the gaming device. After the player enters the total amount of credits they wish to purchase, the player tracking display may instruct the player to hold their credit or debit card or mobile phone near the NFC reader which is coupled to the gaming device to begin the financial transaction. Once the smart chip card or mobile wallet payment information is read via the NFC reader, the player tracking system display may prompt the player to select which credit or debit account to use (if the card holder has multiple account associated with the credit or debit card), enter their personal identification number (PIN) associated with the card if required, and to acknowledge any transaction fees associated with the purchase—thus gather all the necessary data to send the financial transaction to a payment processor system to authorized and complete the transaction. Once the financial transaction has been approved, the system will credit the funds to the credit meter of the gaming device. In various other embodiments, the interactive touchscreen may be the player tracking touchscreen display device, the gaming devices' touch screen and monitor (if the player tracking system shares this device) or a mobile device application in communication with the player tracking system.

In another embodiment of the present invention, the "Buy Credits" button may invoke an interactive web browser on the player tracking interactive display, gaming device touchscreen monitor or mobile device application which links to the casino's payment processing system to which the smart chip card payment information and player inputs are sent to authorized and perform the financial transaction. Once the financial transaction is authorized and completed, the amount of the approved funds is then communicated to the player tracking system which applies the funds to the credit meter of the gaming device. The system and method of invoking of an interactive web browser with a player tracking system is disclosed in U.S. Pat. No. 10,083,570 to Jeffrey George et al., which is incorporated herein by reference.

In another embodiment of the present invention, the player tracking system may be programmed to show or hid the "Buy Credits" button based upon certain defined criteria, such as, but not limited to the follow: display the button to all player, display the button to only players that are logged in at the gaming device, display the button for players that are logged in at the gaming device and also have an established a cashless wagering account, and so forth.

In another embodiment of the present invention, after the financial transaction has been authorized and the approved funds have been applied to the credit meter of the gaming device, the player tracking system may prompt the player if they which to store the method used to purchase the wagering credits for future "Buy Credit" transactions (if the player was logged into the player tracking system prior to performing the financial transaction). If the player indicates they wish to store their method of payment, the player tracking system may save the EMV chip payment information to player tracking database to perform a similar financial transaction in the future to the player tracking account.

In another embodiment of the present invention, after the financial transaction has been authorized and the approved funds have been applied to the credit meter of the gaming device, the player tracking system may prompt the player if they want to become a temporary member of the player loyalty program (if the player wasn't logged into player tracking). If the player indicates they wish to become a temporary member, the player tracking system may use the EMV chip payment information, such as, the credit or debit card number, holder's name, personal identification number associated with the credit or debit card to create a new player account in the player loyalty system—thus enabling the player to log into the player tracking system in the future using the credit or debit card number which the player can used for the financial transaction at the gaming device.

In another embodiment of the present invention, after the financial transaction has been authorized and the approved funds have been applied to the credit meter of the gaming device, the player tracking system may prompt the player may prompt the player if they want to become a cashless wagering player (if the player was logged into the player tracking system, if the player indicates they want to become a cashless wagering player, any remaining unused credit after the gaming session has ended can be uploaded into the cashless wagering account associated with the player to be downloaded to other gaming devices at the casino.

In another embodiment of the present invention, the system disclosed herein provides a system and method for a player to use their credit or debit smart chip card or mobile wallet to perform a financial transaction to purchase gaming credits at workstation or an employee mobile device facilitated by the reading of the credit or debit smart chip information or mobile wallet information by way of the near field communication (NFC) reader coupled to the workstation or the employee mobile device and a player tracking system coupled to a plurality of 3rd party systems. A player may indicate they wish to buy certain amount of gaming credit using their credit or debit or mobile wallet to the employee using the workstation or the employee mobile device. The employee may instruct the player to hold their credit or debit card or mobile phone near the NFC reader which is coupled to the workstation or the employee mobile device to begin the financial transaction. Once the smart chip card or mobile wallet payment information is read via the NFC reader, the workstation or the employee mobile device application may require the employee ask with customer to choose which credit or debit account to they wish to use (if the card holder has multiple account associated with the credit or debit card), enter their personal identification number (PIN) associated with the card if required on a PIN/signature PAD coupled to the workstation or the employee mobile device, and to acknowledge any transaction fees associated with the purchase—thus gather all the necessary data to send the financial transaction to a payment processor system to authorized and complete the transaction. Once the financial transaction has been approved, the employee may exchange the purchased gaming credits for table game chips or add the purchased amount to the player's wagering account which the player can use to download at any gaming device connected to the system.

Figure 2:
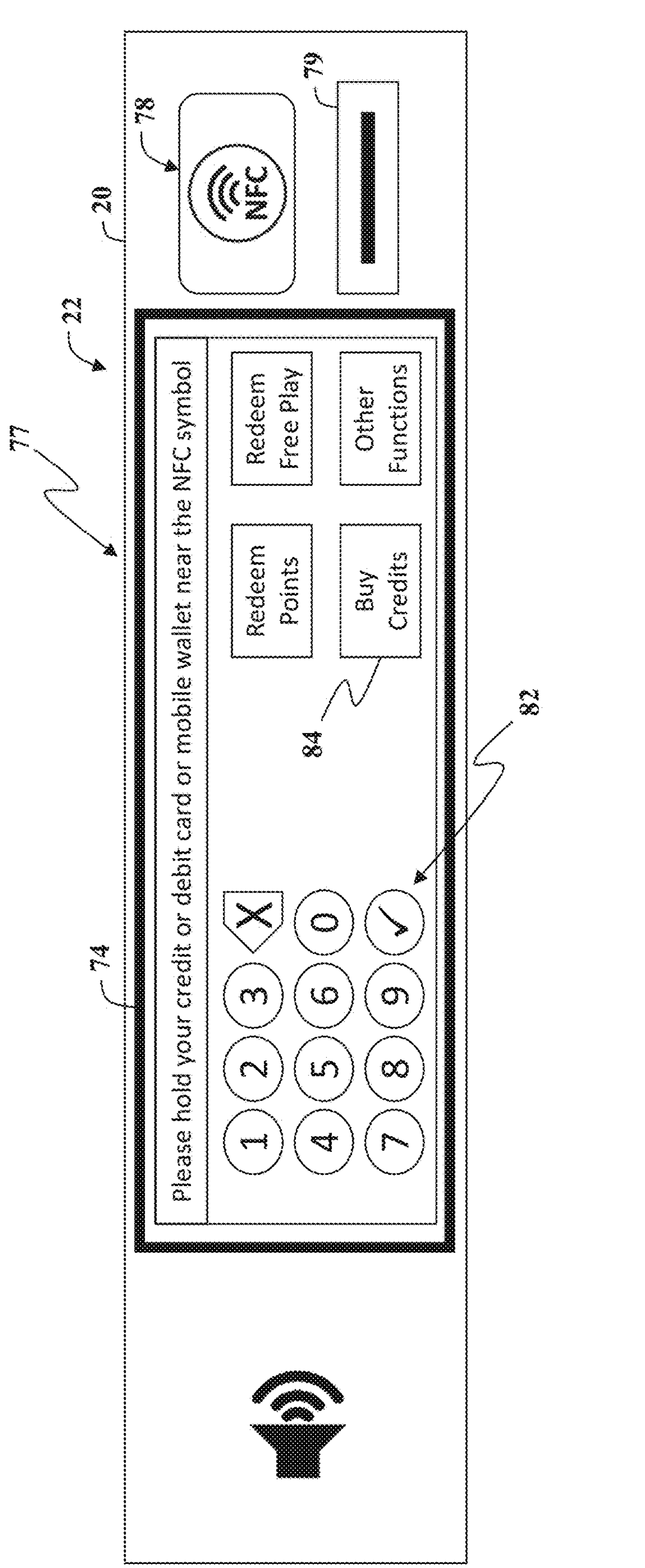
FIG. 2 is a perspective view of an exemplary player tracking device interactive touch screen display that may be used in the system shown in FIG. 1.
Figure 3:
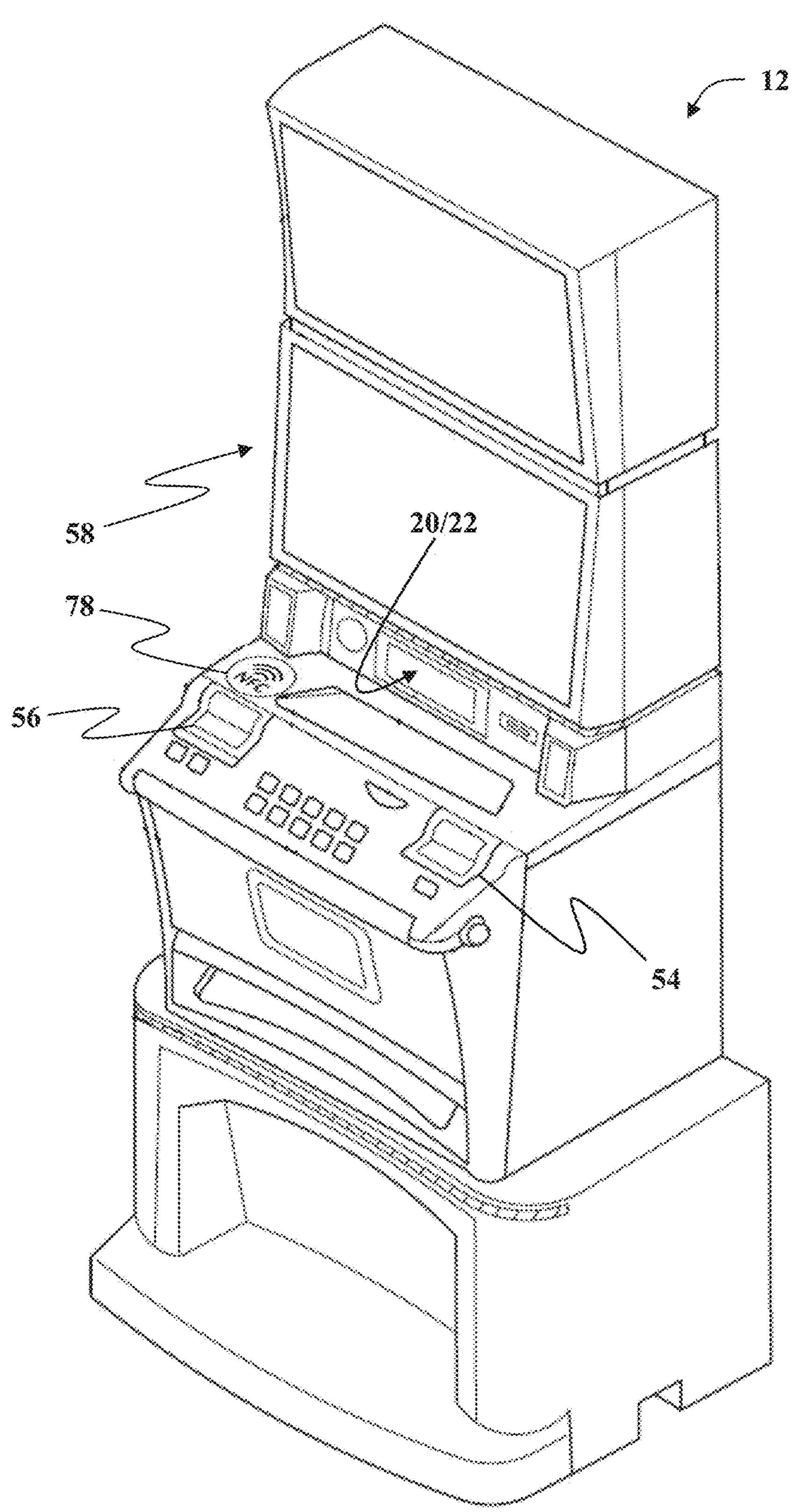
FIG. 3 is a perspective view of an exemplary gaming device that may be used with the system shown in FIG. 1.

Referring to FIGS. 1-3, in the illustrated embodiment, the networked computer system 10 provides gaming property services to players at gaming devices 12, such as, the ability for a player to use their credit or debit cards 24 or mobile device wallets stored on a mobile phone 19 to purchase wagering credit at gaming devices 12 via an NFC reader 78 coupled to the player tracking device 22. In some embodiments, the NFC reader 78 may be coupled to the gaming device 12 in communication to the player tracking device 22. In other embodiments, an NFC reader 35 may be coupled to a workstation or an employee mobile device 17. In the illustrated embodiment, the system 10 includes a plurality of gaming devices 12 coupled to a plurality of player tracking devices 22 in communication with a multipurpose gaming device accounting and player tracking system 14 coupled to a plurality of 3rd party services systems 16. The multipurpose gaming device accounting and player tracking system 14 includes a processor that is coupled to a plurality of player tracking devices 22 that are coupled to a plurality of gaming devices 12 over a communication network 18 and is programmed to execute algorithms included in an accounting and player tracking system program application(s) 44 to perform the functions described herein. The multipurpose gaming device accounting and player tracking system 14 is also coupled to a plurality of 3rd party services systems which communicates to the integration services component 64 over a communication network 18. The player tracking device 22 includes a touchscreen display 74 which provides an interactive player user interface 77 to players to interact with the player tracking functions and features of the multipurpose gaming device accounting the player tracking system 14. The player tracking device 22 may also include a magnetic strip card reader 79 that reads the encoded player account number from the magnetic strip to allow the player to access the corresponding player tracking account and services provided by the player tracking system.

In some embodiments, the player tracking device 22 may include a picture-in-picture device 75 which is used to multiplex the interactive player user interface 77 on a portion of the touchscreen gaming display 58 of the gaming device 12. The interactive user interface 77 may be used to display a "Buy Credits" button 84 that the player can touch to indicate they wish to purchase additional gaming credits using their credit or debit card 24 or mobile wallet stored on a mobile phone 19. The player user interface 77 may instruct the player to enter the total amount of credits they wish to purchase using the rendered numeric keyboard 82 and then instruct the player to hold their credit or debit card 24 of mobile phone 19 near to the NFC reader 78. The player tracking device program application(s) 80 of the player tracking device 22 can then instruct the NFC reader 78 to read the EVM chip payment information from the credit or debit card 24 or payment information from the mobile phone 19. In another embodiment, the player tracking device program application(s) 80 may then instruct the multipurpose gaming device account and player tracking system 14 to communicate with the 3rd party system 16 through the integration services component 64 to determine if the credit or debit card is linked to multiple accounts and prompt the player to select which of their credit or debit accounts they wish to use for the purchase of gaming credit through the player user interface 77. In some embodiments, the 3rd party system 16 includes a payment processing component 36 including a processor in communication via the integrations services component 64 to the player tracking device 22 that executes 3rd party system programming application(s) 38 to processes payment requests. The payment processing component 36 may require a player's personal identification number (PIN) be entered prior to being able to process the financial transaction for the total amount of credits the player wishes to purchase. In this embodiment, the player user interface 77 would prompt the player to input their PIN associated with their credit or debit account using the rendered numeric keypad 82. In another embodiment, the 3rd party system 16 payment processing component 36 or based upon the casino's operational processes may also require that any transactions fees associated with the financial transaction be acknowledge by the player. In this case, the player user interface 77 would prompt the player to acknowledge the fees prior to sending the transaction for processing. In other embodiments, the 3rd party system 16 payment processing component 36 may require the player's signature to process the financial transaction. In this embodiment, the player user interface 77 would prompt the player to sign their name on the touchscreen display 74. Once all the required information and inputs are gathered from the player, the player tracking device program 80 would transmit the payment information via the integration services component 64 of the multipurpose device accounting & player tracking system 14 to the 3rd party system 16 payment processing component 36. Upon approval of the financial transaction, the multi-purpose device accounting & player tracking system 14 will communicate the amount of approved credits that the player tracking device program application(s) 80 to credit to the credit meter of the gaming device 12.

In another embodiment, the "Buy Credits" button displayed on the player user interface 77 may invoke a web browser 76 which may display use the player tracking display 74 to display a webpage from a web services component 62 of the multipurpose device accounting and player tracking system 14 or a webpage from the web-services component 34 of the 3rd party system 16. In this embodiment, prompting of the player to enter the total amount of gaming credits they wish to purchase and to hold their credit or debit card 24 or mobile phone 19 near the NFC reader 78 of the player tracking device 22 as well as the interaction with the player to gather additional information such as PIN or signature, which credit or debit account they wish to use, the acknowledgement of any transactions fees or any other necessary payment information to process the financial transaction is accomplished through the web-browser 76 in communication with the web services component 62 of the multipurpose device accounting and player tracking system 14 or web-services component 34 of the 3rd party system 16. Upon approval of the financial transaction, the web services component 62 of the multipurpose device accounting and player tracking system 14 or the web-services component 34 of the 3rd party system 16 will communicate the amount of approved credit to integration services component 64 of the multi-purpose device accounting & player tracking system 14 which will in turn communicate the amount of approved credits that the player tracking device program application(s) 80 to credit to the credit meter of the gaming device 12.

In another embodiment, the NFC reader 35 is coupled to a workstation or an employee mobile device 17 which may include a PIN/Signature PAD 37. The workstation or the employee mobile device 17 is coupled to the player tracking system 14 which is coupled to a plurality of 3rd party systems 16 over a communication network 18. In this embodiment, a player may indicate they which to purchase a certain amount of gaming credit to the employee using the workstation or the employee mobile device 17. The employee may instruct the player to hold their credit or debit card 24 or mobile phone 19 near the NFC reader 35 coupled to the workstation or the employee mobile device 17. The workstation or the employee mobile device program application(s) 39 transmits the purchase amount and the payment information read via the NFC reader 35 over the network 18 to the multipurpose gaming device account & player track system 14 which is coupled to a 3rd party system 16 to process the financial transaction. If additional information such the player's PIN or signature associated with the credit or debit card 24, is needed, the player is instructed by the workstation or the employee mobile device employee to use the PIN/Signature PAD 37 coupled to the workstation or the employee mobile device 17. In one embodiment, the employee using an employee mobile may give the employee mobile device 17 to the player to enter their PIN or sign on the interactive touchscreen of the mobile device. The workstation or the employee mobile device program application(s) 39 transmits this data over the network 18 to the multipurpose gaming device account & player track system 14 which is coupled to a 3rd party system 16 to process the financial transaction—thus gather all the necessary data to send the financial transaction to a 3rd party payment processor system 16 to authorized and complete the transaction. Once the financial transaction has been approved, the employee may exchange the amount of purchased gaming credits for table game chips or add the purchased amount to a player's wagering account 46 stored in a database which the player can use to download at any gaming device 12 connected to the system 10.

In some embodiments, the networked computer system 10 includes a near field communication (NFC) reader 78 coupled to a gaming device 12 and a player tracking system 14. Upon the request of the player to purchase an amount of wagering credits at the gaming machine 12 and the player is instructed to hold their chip enabled credit or debit card 24 or mobile phone 19 near the NFC reader 78, the player tracking system is programmed to receive NFC data from the NFC reader including the credit or debit card or mobile wallet payment information data from the player's credit or debit card or mobile wallet, and transmit said information to a payment processor and to receive a response from the payment processor which either grants or denies the wagering credit purchase amount. Upon the successful approval of the purchase transaction, the player tracking system credits the amount of purchased wagering credits to the credit meter of the gaming device.

The networked computer system 10 may include a workstation or an employee mobile device including a near field communication (NFC) reader coupled to a player tracking system. Upon the request of the player to purchase an amount of wagering credit to employee using the workstation or an employee mobile device, the employee enters the amount of wagering credits the player wishes to purchase, and the player is instructed to hold their chip enabled credit or debit card or mobile phone near the NFC reader coupled to the workstation or the employee mobile device. The workstation or the employee mobile device application is programmed to receive the NFC data from the player's credit or debit card or mobile wallet and transmit said information to a payment processor and to receive a response from the payment processor which either grants or denies the wagering credit purchase amount. Upon successful approval of the purchase transaction, the employee may exchange the purchase amount for table game chips or deposit the purchase amount into the player's wagering account.

For example, in some embodiments, the gaming device 12 includes a wagering gaming machine 12, such as a video slot machine, that includes a gaming cabinet supporting a display device 58, an NFC reader 78, and a control panel, and housing a game control unit that includes a computer processor that is programmed generate and display a structured graphic user interface displayed on the display device 58 using computer generated graphics. For example, the structured graphic user interface may include a plurality of virtual reels displaying game symbols within a grid. The control unit may be programmed to animate the virtual reels to simulate spinning the virtual through the grid, and stop the virtual reels to reveal an outcome of a game. The control unit may also be programmed to generate and render animated sequences of computer-generated images on graphic user interface screens to display bonus features associated with the game. The display device 58 may include a touchscreen display including liquid crystal display devices and/or organic EL display devices and the like. The gaming machine 12 may also include a player tracking bracket 20 mounted to the gaming cabinet and configured to support the player tracking device 22 from the gaming cabinet.

The processor of the gaming machine 12 executes gaming device program application(s) and wagering game component(s) 52, configured to present a wagering game on which wagering game credits can be wagered. The player tracking system 14 is coupled to the gaming machine 12 and includes a receiver configured to communicate with Near Field Communication (NFC) device(s) 78 to read and interact with credit and debit smart chip cards or mobile wallets to facilitate the purchase of wagering game credits playable on the gaming device. The player tracking device 22 includes a touchscreen player display 74 configured to enable players to enter the amount of wagering credits to purchase and provide any additional inputs required to facilitate the purchase of wagering game credits. The gaming machine 12 includes a ticket printer 56 mounted to the gaming cabinet and configured to enable a player to cash out any remaining unused wagering game credits at the end of their play session, and a bill acceptor 54 mounted to the gaming cabinet that includes an input and output device that is configured to accept a bill, a ticket, and/or a cash card into the bill acceptor 54 to enable an amount of gaming credits associated with a monetary value of the bills, ticket, and/or cash card to be credited to the gaming machine 12.

For example, in some embodiments, the system 10 includes a plurality of gaming devices 12 that are coupled to a plurality of player tracking devices 22. Each player tracking device 22 is coupled to a near field communication (NFC) reader 78 that is configured to receive NFC payment information data from a credit or debit card 24 or mobile wallet 19 upon a player indicating they wish to purchase a certain amount of gaming credits via an interactive touchscreen display device 77 at the gaming device 12. In some embodiments, the NFC reader 78 is mounted to the gaming cabinet of the gaming devices 12 in communication with the corresponding player tracking device 22. In other embodiments, the NFC reader 78 may be mounted to the player tracking device 22 (as shown in FIG. 2).

In the illustrated embodiment, the system 10 also includes the player tracking system 14 that includes a processor coupled in communication with each player tracking device 22. The processor of the player tracking system 14 programmed to execute an algorithm including the steps of receiving a request from a player tracking device 22 indicating an amount of gaming credits to purchase to be used with a corresponding gaming device 12, and receiving a signal from the NFC reader 78 indicating payment information data received from the credit or debit card 24 or mobile wallet 19 via the NFC reader 78. The processor then transmits a purchase request including the requested amount of gaming credits to purchase and the received payment information to a payment processor 16 for authorization. Upon receiving approval of the purchase request from the payment processor 16, the processor adds the amount of gaming credit to purchase to the credit meter of the corresponding gaming device 12.

In some embodiments, the processor of the player tracking system 14 is programmed to render a prompt icon on the interactive touchscreen display device 77 prompting the player to hold their credit or debit card 24 or mobile phone 19 near the NFC reader 78. The processor may also be programmed to render a prompt icon on the interactive touchscreen display device 77 prompting the player and receiving a personal identification number (PIN) associated with credit or debit card 24, and transmit the received PIN to the payment processor 16 for use in authorizing the purchase request.

The processor may also be programmed to render a prompt icon on the interactive touchscreen display device 77 prompting the player and receiving the player's signature associated with credit or debit card 24, and transmit a captured image of the player's signature to the payment processor 16 for use in authorizing the purchase request.

The processor may also render a prompt icon on the interactive touchscreen display device 77 prompting the player to select which credit or debit account they wish to use for the purchase of gaming credits and transmit the selected credit or debit account to the payment processor 16 for use in authorizing the purchase request.

In some embodiments, the processor of the player tracking system 14 may be programmed to render a prompt icon on the interactive touchscreen display device 77 prompting the player to acknowledge any transaction fees associated with the purchase transaction. The processor may also be programed to render the interactive touchscreen display device 74 on a gaming device touchscreen display 58 of the corresponding gaming device 12.

In some embodiments, the payment processor 16 may include a service supplied by the automated teller machine (ATM) 3rd party system that is coupled to the player tracking system 14. The payment processor 16 may also include a service supplied by a 3rd party point of sale system that is coupled to the player tracking system 14. The payment processor 16 may also include a service supplied by a 3rd party hotel system that is coupled to the player tracking system 14.

In some embodiments, the system 10 may also include a workstation or an employee mobile device 17 that is coupled to the player tracking system includes a receiver configured to communicate with Near Field Communication (NFC) devices to read and interact with cred and debit smart chip cards or mobile wallets to facilitate the purchase of wagering credits which can be used to buy chips playable on gaming tables or deposited into a player's wagering account to be used at any gaming device connected to the system that interacts with a player's wagering account.

For example, in some embodiments, the system 10 includes a plurality of gaming devices 12 that are coupled to a plurality of player tracking devices 22 with each player tracking device 22 including an interactive touchscreen display device 77 and an NFC reader 78 configured to receive NFC payment information data from a credit or debit card 24 or mobile wallet 19 upon a player indicating they wish to purchase a certain amount of gaming credits at a gaming device 12. The system 10 also includes the player tracking system 14 including the processor coupled in communication with each player tracking device 22 and to the 3rd party system 16, and is programmed to execute an algorithm including the steps of receiving a request from a player tracking device 22 indicating an amount of gaming credits to purchase to be used with a corresponding gaming device 12, transmitting a request to the 3rd party system 16 to invoke an interactive payment processor webpage, and displaying the interactive payment processor webpage on the interactive touchscreen display device 77. The processor is also programmed to receive payment information data from a corresponding NFC reader 78, transmit a purchase request including the requested amount of gaming credits to purchase and payment information to the 3rd party system 16 via the interactive payment processor webpage for authorization, and upon receiving approval of the purchase by the payment processor web page, adding the amount of gaming credit purchased to the credit meter of the corresponding gaming device 12.

In other embodiments, the system 10 includes a workstation or an employee mobile device 17 that includes a NFC reader 78 configured to receive NFC payment information data from a credit or debit card 24 or mobile wallet 19 upon a player indicating they wish to purchase a certain amount of gaming credits to the workstation or an employee mobile device 17. The player tracking system 14 includes a processor that is coupled in communication with the workstation or the employee mobile device 17 and with the 3rd party payment processor system 16. The processor of the player tracking system 14 is programmed to execute an algorithm including the steps of receiving the payment information data from the NFC reader 78, transmitting an amount of gaming credits to purchase and payment information to the 3rd party payment processor system 16 for authorization, and upon receiving approval of the purchase from the 3rd party payment processor system 16, providing the player with wagering chips equivalent to the purchase amount. In some embodiments, upon receiving approval of the purchase from the 3rd party payment processor system 16, the processor may be programmed to add the approved purchase amount of credit to a player's wagering account.

Figure 4:
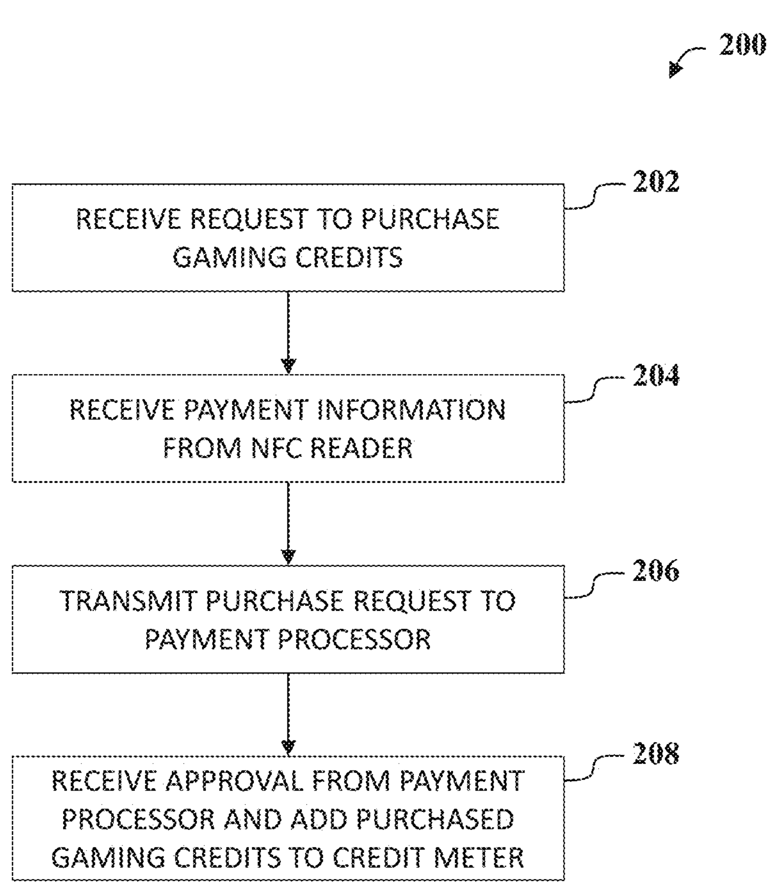
FIG. 4 is a flow chart illustrating an algorithm used during operation of the networked computer system for providing gaming property services, according to one embodiment of the present invention.

FIG. 4 is a flow chart of method 200 illustrating the algorithms included in the application program(s) 44, 52, 80 and performed by the processor of the player tracking system 14 for operating the system 10 to provide gaming property services. The method includes a plurality of steps. Each method step may be performed independently of, or in combination with, other method steps. Portions of the methods may be performed by any one of, or any combination of, the components of the system 10. In method step 202, the processor of the player tracking system 14 receives a request from a player tracking device indicating an amount of gaming credits to purchase to be used with the corresponding gaming device. In method step 204, the processor receives a signal from the NFC reader indicating payment information data received from the credit or debit card or mobile wallet via the NFC reader. In method step 206, the processor transmits a purchase request including the requested amount of gaming credits to purchase and the received payment information to a payment processor for authorization. In method step 208, the processor receives approval of the purchase request from the payment processor, adding the amount of gaming credit to purchase to the credit meter of the corresponding gaming device.

Obviously, many modifications and variations of the present invention are possible in light of the above teachings. The invention may be practiced otherwise than as specifically described within the scope of the claims.

Exemplary embodiments of a system and method for providing a player the ability to use their credit or debit card or mobile wallet to purchase gaming credits at a gaming device are described above in detail. The system and method are not limited to the specific embodiments described herein, but rather, components of the system and/or steps of the method may be utilized independently and separately from other components and/or steps described herein. For example, the system may also be used in combination with other wagering and 3rd party systems and methods and is not limited to practice with only the system as described herein. Rather, an exemplary embodiment can be implemented and utilized in connection with many other monitoring applications.

The gaming device, player tracking device accounting & player tracking system and 3rd party system programming application(s) may be implemented via a controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a program application(s) may be executed on a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor. One or more program applications may be executed on a processor, such as a web browser (e.g., Microsoft Internet Explorer, Mozilla Firefox, Apple Safari, Google Chrome, and Opera, etc.), to access and view content over a computer network. In particular implementations, the program applications allow a user to enter addresses of specific network resources to be retrieved, such as resources hosted by a networking system. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page. A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBx, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In some embodiments, a network, as describe herein, includes a network addressable system that, in various example embodiments, comprises one or more physical servers and data stores. The one or more physical servers are operably connected to a computer network via, by way of example, a set of routers and/or networking switches. In an example embodiment, the functionality hosted by the one or more physical servers may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), Flash, ActionScript, and the like. Data stores may store content and data relating to, and enabling, operation of the networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Data stores corresponds to one or more of a variety of separate and integrated databases, such as relational databases and object-oriented databases, that maintain information as an integrated collection of logically related records or files stored on one or more physical systems.

By way of example, while embodiments of the present disclosure have been described as operating in connection with a networking website, various embodiments of the present invention can be used in connection with any communications facility that supports web applications. Furthermore, in some embodiments the term "web page", "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the claims. The invention may be practiced otherwise than as specifically described within the scope of the claims. It should also be noted that the steps and/or functions listed within the claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A networked computer system, comprising:

a plurality of gaming devices coupled to a plurality of player tracking devices, each player tracking device coupled to a near field communication (NFC) reader configured to receive NFC payment information data from a credit or debit card or mobile wallet payment device upon a player indicating they wish to purchase a certain amount of gaming credits via an interactive touchscreen display device at a corresponding gaming device; and a player tracking system including a processor coupled in communication with each player tracking device, the processor of the player tracking system programmed to execute an algorithm including the steps of:

receiving a request from the player via a player tracking device indicating a request to purchase gaming credits with the credit or debit credit card or mobile wallet payment device on the corresponding gaming device;

rendering a button icon on the interactive touchscreen display device that instructs the player to tap the credit or debit card or mobile wallet payment device to the NFC reader;

rendering a first prompt icon on the interactive touchscreen display device to prompt the player to enter an amount of gaming credits to purchase;

receiving a signal from the NFC reader indicating payment information data received from the credit or debit card or mobile wallet payment device via the NFC reader;

rendering a second prompt icon on the interactive touchscreen display device to prompt the player to input a personal identification number (PIN) associated with the credit or debit card or mobile wallet payment device;

transmitting a purchase request including the requested amount of gaming credits to purchase, the received payment information data, and the PIN associated with the credit or debit card or mobile wallet payment device to a payment processor for authorization;

upon receiving approval of the purchase request from the payment processor including an authorization code, adding the amount of gaming credits to purchase to a credit meter of the corresponding gaming device; and recording purchase method information associated with the credit or debit card or mobile wallet payment device used for the purchase request and the authorization code received from the payment processor in a database associated with crediting of the gaming credits to the credit meter of the corresponding gaming device.

2. The networked computer system of claim 1, wherein the processor is programmed to execute the algorithm including the steps of:

rendering a prompt icon on the interactive touchscreen display device prompting the player to hold the credit or debit card or mobile wallet payment device near the NFC reader.

3. The networked computer system of claim 1, wherein the processor is programmed to execute the algorithm including the steps of:

rendering a prompt icon on the interactive touchscreen display device prompting the player and receiving the player's signature associated with the credit or debit card or mobile wallet payment device; and transmitting a captured image of the player's signature to the payment processor.

4. The networked computer system of claim 1, wherein the processor is programmed to execute the algorithm including the steps of:

rendering a prompt icon on the interactive touchscreen display device prompting the player to select which credit or debit account they wish to use for the purchase of gaming credits; and transmitting the selected credit or debit account to the payment processor.

5. The networked computer system of claim 1, wherein the processor is programmed to execute the algorithm including the steps of:

rendering a prompt icon on the interactive touchscreen display device prompting the player to acknowledge any transaction fees associated with the purchase transaction.

6. The networked computer system of claim 1, wherein the processor is programmed to execute the algorithm including the steps of:

rendering the interactive touchscreen display device on a gaming device touchscreen display of the corresponding gaming device.

7. The networked computer system of claim 1, wherein the NFC reader is mounted to the gaming device in communication with the player tracking device coupled to the player tracking system.

8. The networked computer system of claim 1, wherein the payment processor is a service supplied by an automated teller machine (ATM) 3rd party system coupled to the player tracking system.

9. The networked computer system of claim 1, wherein the payment processor is a service supplied by a 3rd party point of sale system coupled to the player tracking system.

10. The networked computer system of claim 1, wherein the payment processor is a service supplied by a 3rd party hotel system coupled to the player tracking system.

11. The networked computer system of claim 1, wherein the processor is programmed to execute the algorithm including the steps of:

upon determining the player is an uncarded player, rendering a prompt icon on the interactive touchscreen display device prompting the player to become a temporary member of a player loyalty program; and upon receiving approval from the player via the interactive touchscreen display device, generating a new player account including a credit or debit card number, a holder's name, the received PIN associated with the credit or debit card or mobile wallet payment device to enable the player to log into the player tracking system using the credit or debit card number.

12. A networked computer system, comprising:

a plurality of gaming devices coupled to a plurality of player tracking devices, each player tracking device including an interactive touchscreen display device and a near field communication (NFC) reader configured to receive NFC payment information data from a credit or debit card or mobile wallet payment device upon a player indicating they wish to purchase a certain amount of gaming credits at a corresponding gaming device; and a player tracking system including a processor coupled in communication with each player tracking device and to a 3rd party system, the processor is programmed to execute an algorithm including the steps of:

receiving a request from the player via a player tracking device indicating a request to purchase gaming credits with the credit or debit credit card or mobile wallet payment device on the corresponding gaming device;

transmitting a request to the 3rd party system to invoke an interactive payment processor web page and displaying the interactive payment processor webpage on the interactive touchscreen display device;

rendering a button icon on the interactive touchscreen display device that instructs the player to tap the credit or debit card or mobile wallet payment device to the NFC reader;

rendering a first prompt icon on the interactive touchscreen display device to prompt the player to enter an amount of gaming credits to purchase;

receiving payment information data from the credit or debit card or mobile wallet payment device via the NFC reader;

rendering a second prompt icon on the interactive touchscreen display device to prompt the player to input a personal identification number (PIN) associated with the credit or debit card or mobile wallet payment device;

transmitting a purchase request including the requested amount of gaming credits to purchase, the payment information data, and the PIN associated with the credit or debit card or mobile wallet payment device to the 3rd party system via the interactive payment processor webpage for authorization;

upon receiving approval of the purchase by the payment processor web page including an authorization code, adding the amount of gaming credits purchased to a credit meter of the corresponding gaming device; and recording purchase method information associated with the credit or debit card or mobile wallet payment device used for the purchase request and the authorization code received from the payment processor in a database associated with crediting of the gaming credits to the credit meter of the corresponding gaming device.

13. A networked computer system, comprising:

an employee mobile device including a near field communication (NFC) reader configured to receive NFC payment information data from a credit or debit card or mobile wallet payment device upon a player indicating they wish to purchase a certain amount of gaming credits to the employee mobile device employee; and a player tracking system in communication with the employee mobile device and with a 3rd party payment processor system, the player tracking system including a processor programmed to execute an algorithm including the steps of:

rendering a button icon on the employee mobile device that instructs the player to tap the credit or debit card or mobile wallet payment device to the NFC reader;

rendering a first prompt icon on the employee mobile device to prompt the player to enter an amount of gaming credits to purchase;

receiving the payment information data from the credit or debit card or mobile wallet payment device via the NFC reader;

rendering a second prompt icon on the employee mobile device to prompt the player to input a personal identification number (PIN) associated with the credit or debit card or mobile wallet payment device;

transmitting an amount of gaming credits to purchase, and the payment information data, and the PIN associated with the credit or debit card or mobile wallet payment device to the 3rd party payment processor system for authorization; and upon receiving approval of the purchase from the 3rd party payment processor system including an authorization code, providing the player with wagering chips equivalent to the purchase amount; and recording purchase method information associated with the credit or debit card or mobile wallet payment device used for the purchase request and the authorization code received from the payment processor in a database associated with crediting gaming credits.

14. The networked computer system of claim 13, wherein the processor is programmed to execute the algorithm including the steps of:

adding the approved purchase amount of credit to a player's wagering account.

* * * * *